US011415157B2

(12) United States Patent
Vadon

(10) Patent No.: US 11,415,157 B2
(45) Date of Patent: Aug. 16, 2022

(54) MAGNET HOLDER FOR CARGO TIE-DOWN STRAP HOOK

(71) Applicant: Taylor Vadon, Healdsburg, CA (US)

(72) Inventor: Taylor Vadon, Healdsburg, CA (US)

( * ) Notice: Subject to any disclaimer, the term of this patent is extended or adjusted under 35 U.S.C. 154(b) by 371 days.

(21) Appl. No.: 16/776,370

(22) Filed: Jan. 29, 2020

(65) Prior Publication Data

US 2020/0240448 A1 Jul. 30, 2020

Related U.S. Application Data

(60) Provisional application No. 62/798,888, filed on Jan. 30, 2019.

(51) Int. Cl.
*F16B 1/00* (2006.01)
*B60P 7/08* (2006.01)

(52) U.S. Cl.
CPC ..................... *F16B 1/00* (2013.01); *B60P 7/08* (2013.01); *F16B 2001/0035* (2013.01)

(58) Field of Classification Search
CPC combination set(s) only.
See application file for complete search history.

(56) References Cited

U.S. PATENT DOCUMENTS

| 9,221,381 | B1 | 12/2015 | Flud | |
| 9,307,808 | B1* | 4/2016 | Lill | A44B 99/00 |
| 9,725,028 | B1 | 8/2017 | Etzkorn | |
| 10,206,461 | B1* | 2/2019 | Swetish | B60R 9/08 |
| 10,589,657 | B1* | 3/2020 | Etzkorn | F16B 1/00 |
| 2005/0286986 | A1* | 12/2005 | Thomson | B60P 7/0823 410/117 |
| 2007/0099469 | A1* | 5/2007 | Sorensen | A45F 5/02 439/289 |
| 2009/0041557 | A1 | 2/2009 | Lin | |
| 2009/0269156 | A1* | 10/2009 | Siegenthaler | B60P 7/0815 410/116 |
| 2009/0272862 | A1 | 11/2009 | Pinchuk et al. | |
| 2010/0215455 | A1 | 8/2010 | Burris | |
| 2011/0083254 | A1 | 4/2011 | Trutna et al. | |
| 2017/0127764 | A1* | 5/2017 | Fiedler | A44B 99/00 |

FOREIGN PATENT DOCUMENTS

CN   108749704 A * 11/2018 ............... B60P 3/00

* cited by examiner

*Primary Examiner* — Monica E Millner

(57) ABSTRACT

A magnet holder for a tie-down strap hook configured for installation on a hook formed of bent cylindrical rod that defines an interior opening. The magnet holder includes a base with substantially planar opposing and parallel first and second plates, the first plate including fastener structure; a magnet keeper disposed between the first and second plates; and a cover having parallel planar front and back sides, each having a lower edge with integral fastener structure configured to engage with the fastener structure of the base, and right and left angled semi-cylindrical shoulders disposed between and separating the front and back sides, the right and left shoulders having interior sides configured to conform to the cylindrical rod of the tie-down hook.

7 Claims, 6 Drawing Sheets

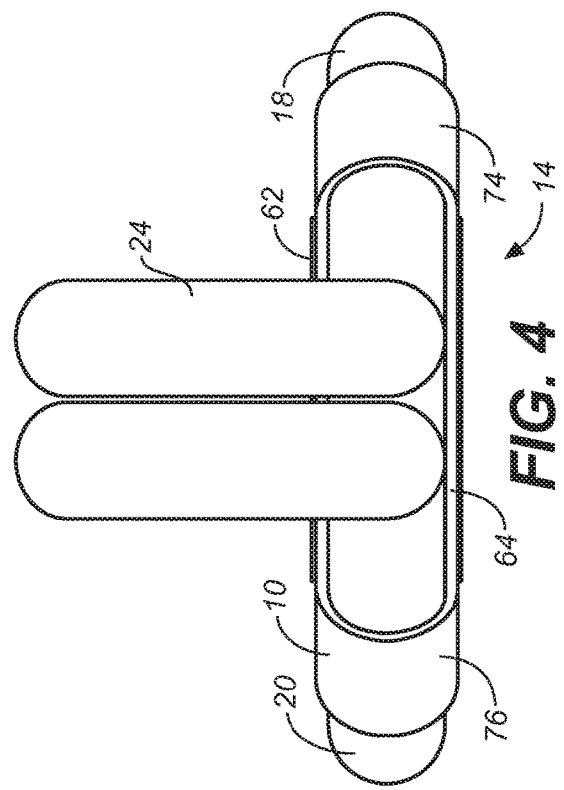
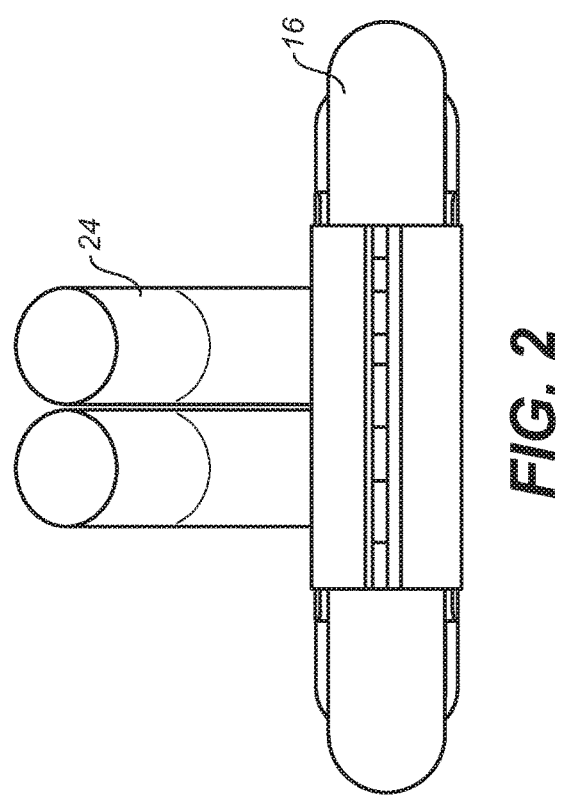
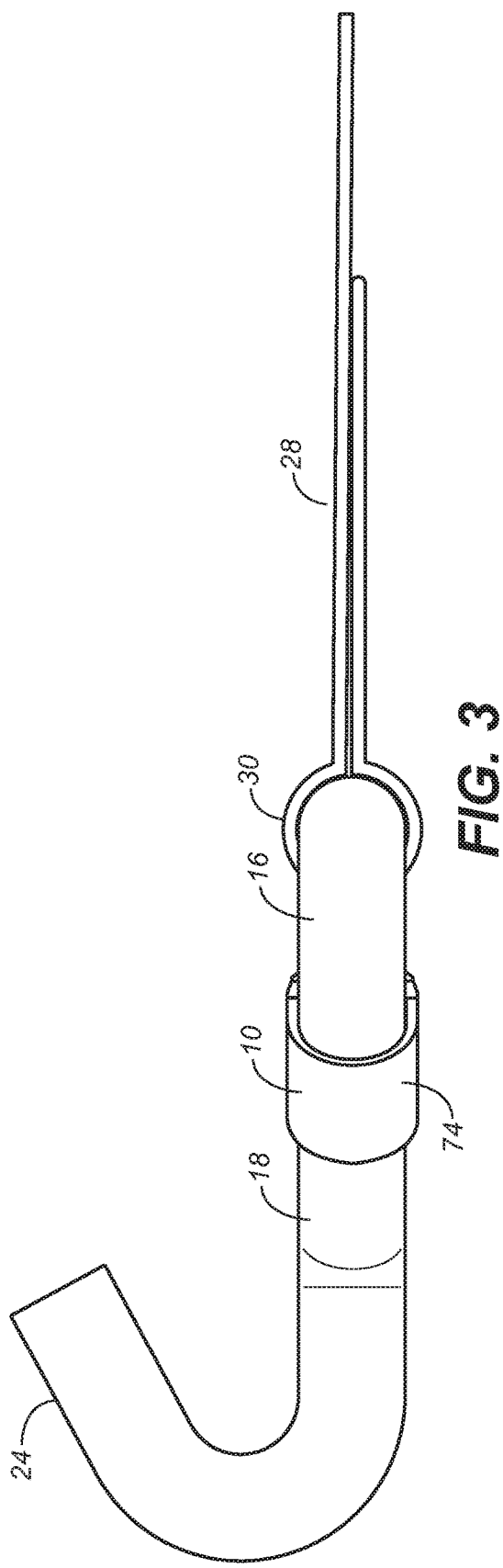

MAGNET HOLDER FOR CARGO TIE-DOWN STRAP HOOK

CROSS REFERENCES TO RELATED APPLICATIONS

The present application claims the benefit of U.S. Provisional Patent Application Ser. No. 62/798,888, filed Jan. 30, 2019, and is incorporated herein by reference in its entirety.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to cargo securing apparatus, and more particularly to cargo tie-down strap systems, and still more particularly to a magnet holder for tie-down strap hooks.

Background Discussion

Cargo transported by truck, flatbed trailer, pick-ups, rail cars, and cargo disposed in interior cargo compartments in freight transport vehicles of many kinds, including aircraft, watercraft, and motor vehicles, is commonly stabilized and secured to prevent movement. Quite commonly the means for securing the cargo involves the use of cargo tie-down straps which are secured to anchor points using hooks or other connection structure on the ends of the tie-down straps. The tie-down straps or anchors may include a ratcheting assembly for tightening the strap.

Hooks disposed on the ends of tie-down straps come in myriad forms. A highly popular form well-known in the art is shown in FIG. 1. It includes a unitary cylindrical rod 12 bent to form a triangular body 14 in one plane, the triangular body including a base segment 16 and first and second side segments 18, 20. The side segments converge at an upper corner 22, bend into parallel alignment, extend slightly outwardly from the corner, and then bend together and off the plane of the triangular body to form conjoined curved fingers 24. The end 26 of the of the tie-down strap 28 is wrapped and sewn or otherwise formed in a bonded loop 30 around the base segment. These structures and features are not new and comprise prior art. The triangular shape, in particular, is common, but it is not universal, and many hooks have a body portion and hook portion that lie in a single plane.

As will be appreciated, the triangular body forms an interior opening 32 in substantially a single plane. When coupling a tie-down strap to anchoring structure, the opening itself provides no function or feature to enhance attachment to the anchoring structure. In fact, tie-down straps are notorious for swinging around loose and occasionally moving away from the anchors and out of reach as cargo or cargo covers are arranged. Thus, the tie-down operation may call for two persons for optimal efficiency.

Because of the disadvantages of prior art tie-down hooks, it would be advantageous to have an after-market or OEM magnet holder that couples to a tie-down hook enabling an effective but light magnetic connection to ferromagnetic tie-down anchors and thereby to prevent the hook from inadvertently moving during tie-down operations.

BRIEF SUMMARY OF THE INVENTION

The present invention is a magnet holder for a tie-down strap which securely attaches one or more magnets to the body portion of a tie-down strap hook, thereby providing holding force to keep the hook in place on ferromagnetic surface even when the hook portion is not engaging a fixture.

It is principal object of the invention to provide a new and improved magnet holder adapted for after-market installation on a tie-down strap hook.

It is another object of the present invention to provide a new and improved magnet holder for a tie-down strap hook that includes a housing enabling a user to insert or remove magnets to adjust the holding power of the enclosed magnets.

Yet another object is to provide a magnet holder that does not increase the size of the hook, such that it does not interfere with any use possible without the magnet holder installed.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

The disclosure herein is not limited in its application to the details of the construction and the arrangements set forth in the following description or illustrated in the drawings. The inventive apparatus is capable of other embodiments and of being practiced and carried out in various ways. As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure.

BRIEF DESCRIPTION OF THE DRAWINGS

FIG. 2 is a proximal end view in elevation thereof;

FIG. 3 is a side view in elevation thereof;

FIG. 4 is a distal end view in elevation thereof;

DETAILED DESCRIPTION OF THE INVENTION

Figure 1:
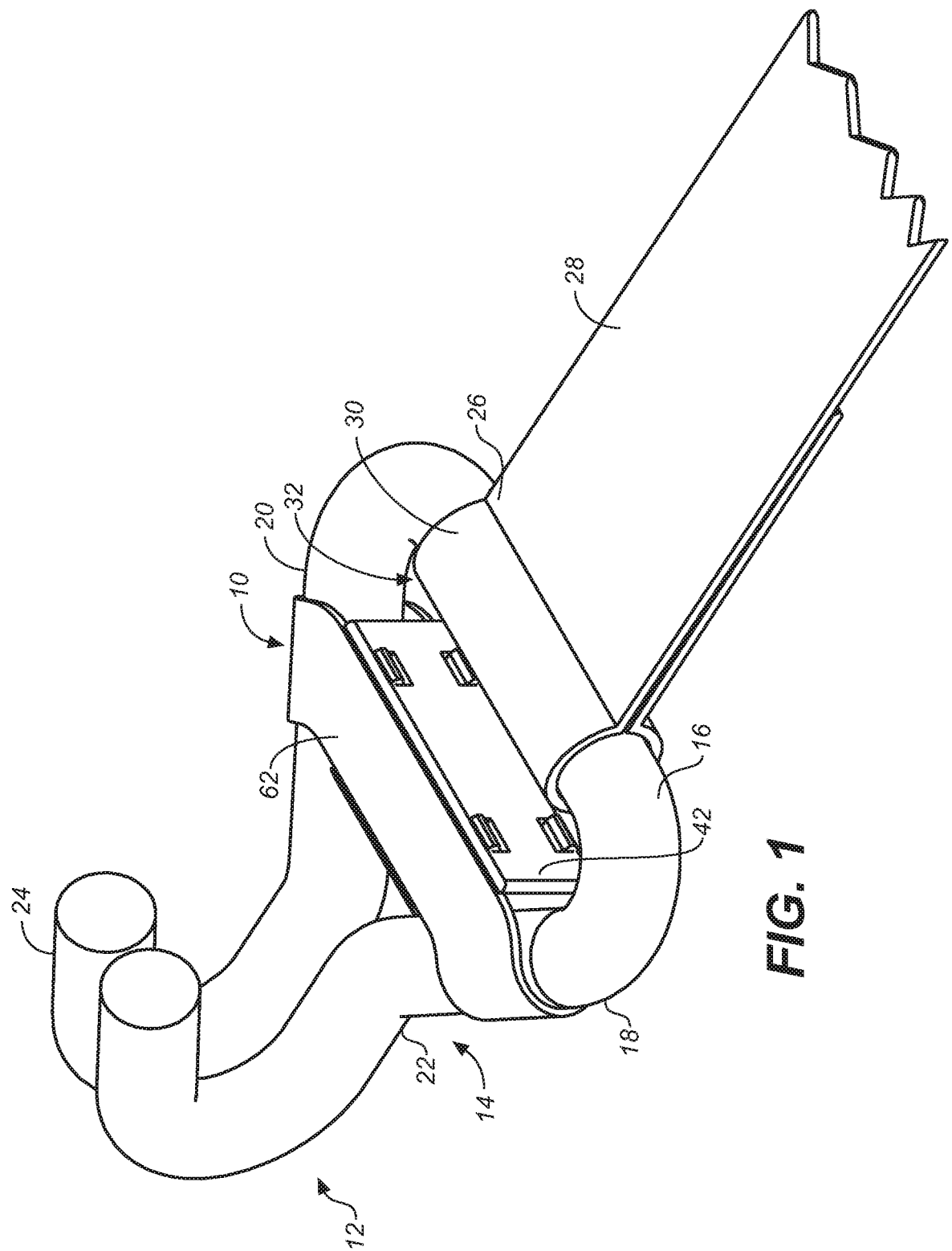
FIG. 1 is an upper perspective view of a the magnet holder of the present invention, installed in a tie-down strap hook.
Figure 5:
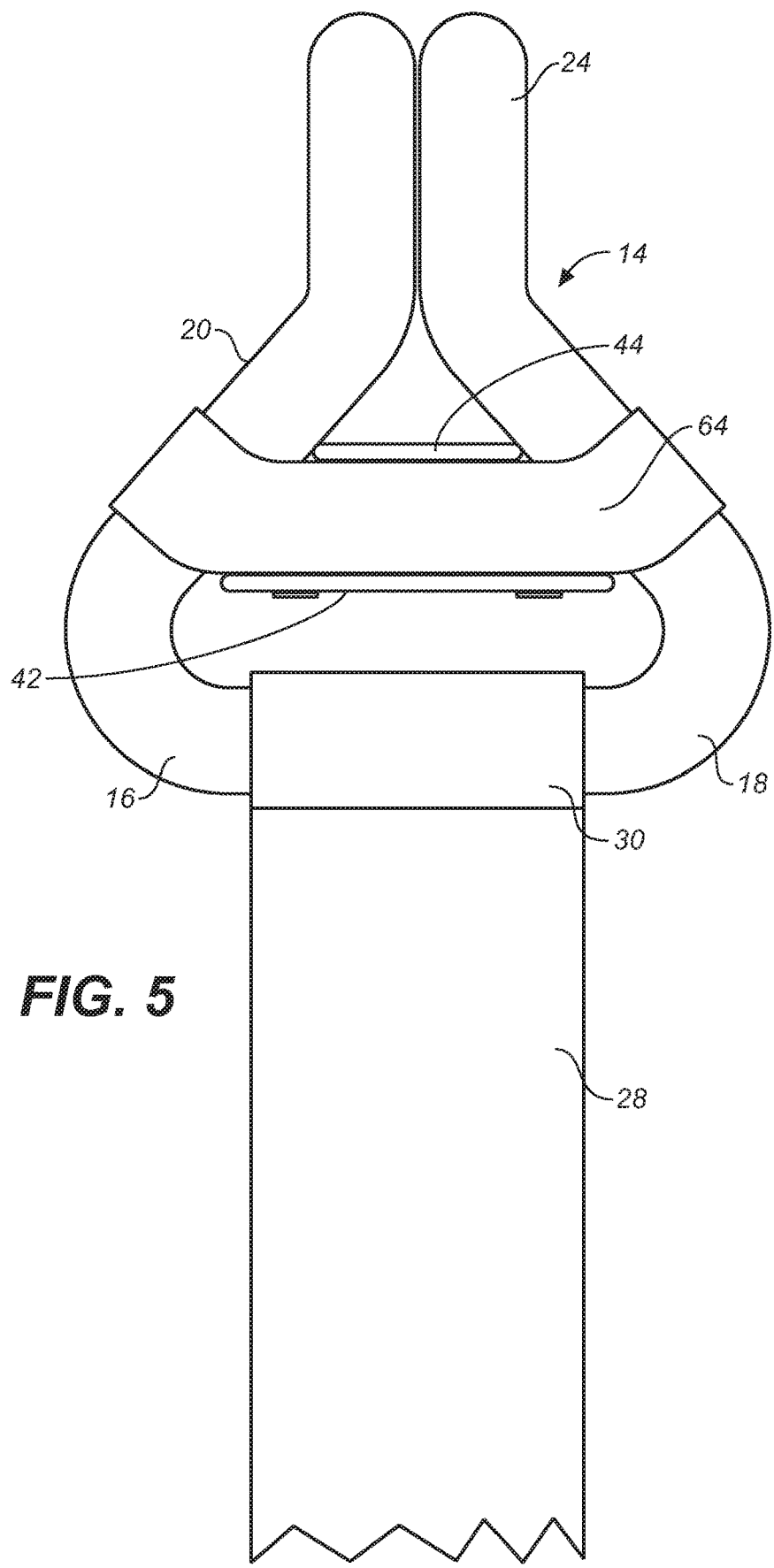
FIG. 5 is a bottom view thereof.
Figure 6:
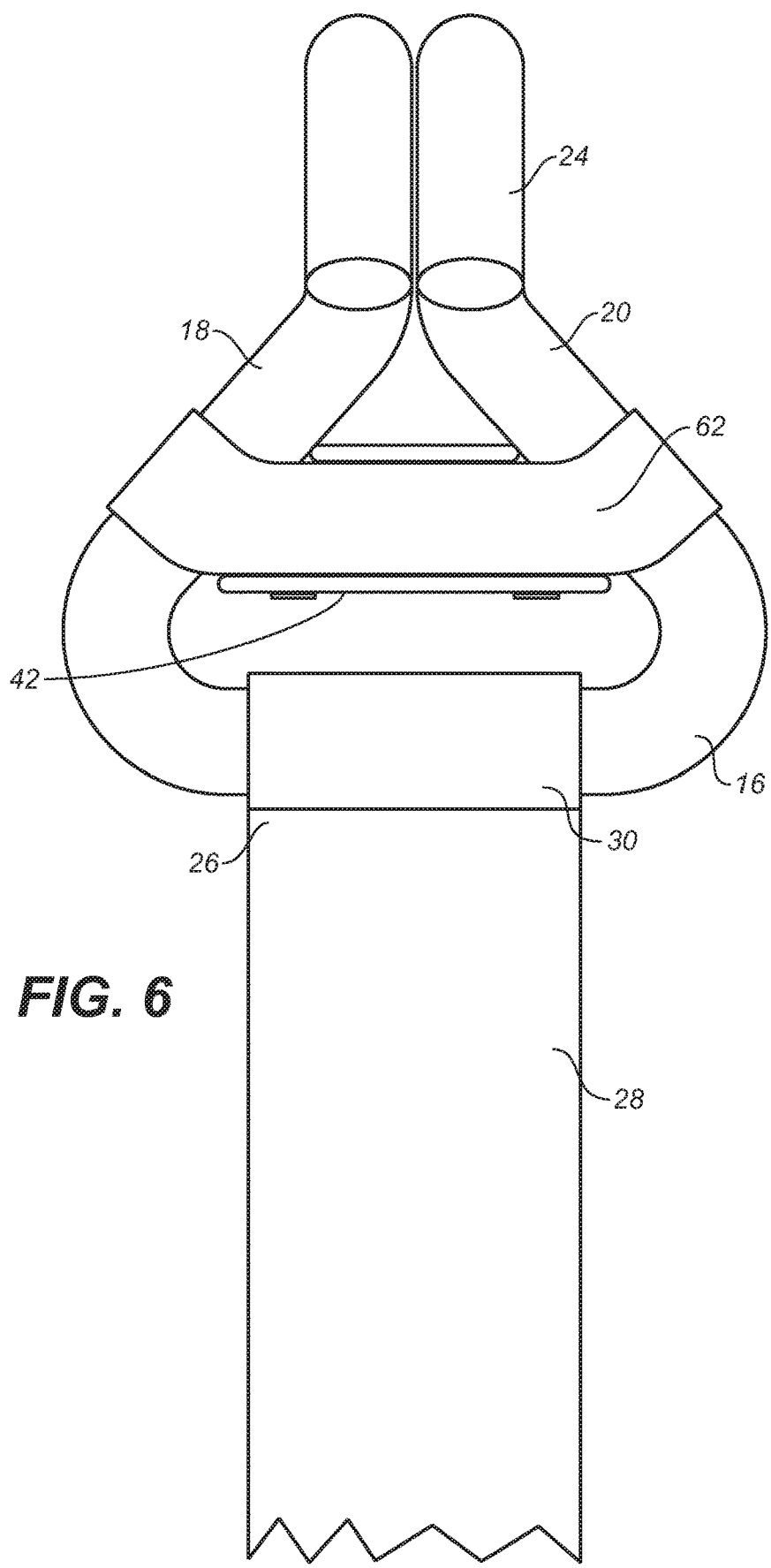
FIG. 6 is a top plan view thereof.
Figure 7:
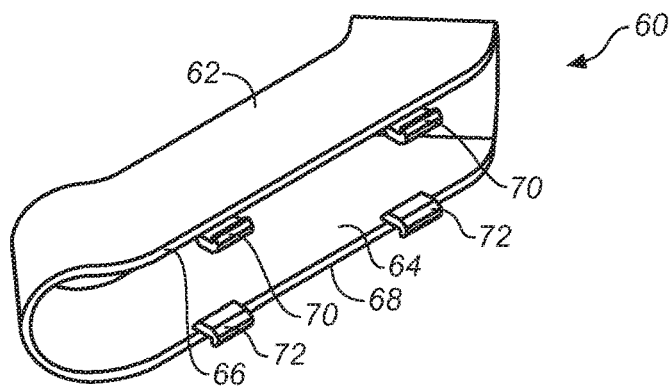
FIG. 7 is a lower perspective view of the magnetic holder cover.
Figure 8:
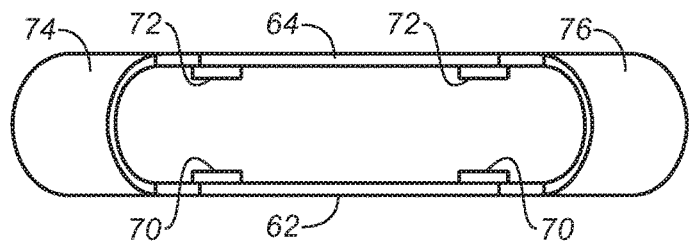
FIG. 8 is a top plan view thereof.
Figure 9:
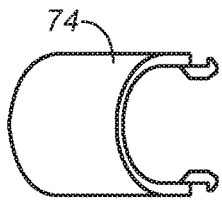
FIG. 9 is an end view thereof.
Figure 10:
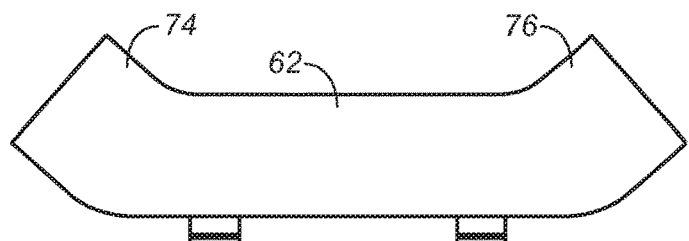
FIG. 10 is a side view in elevation thereof.
Figure 11:
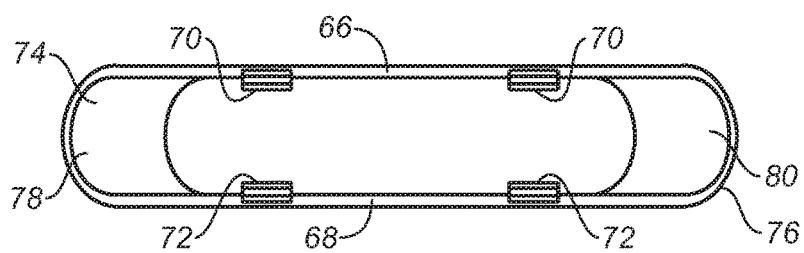
FIG. 11 is a bottom view thereof.
Figure 12:
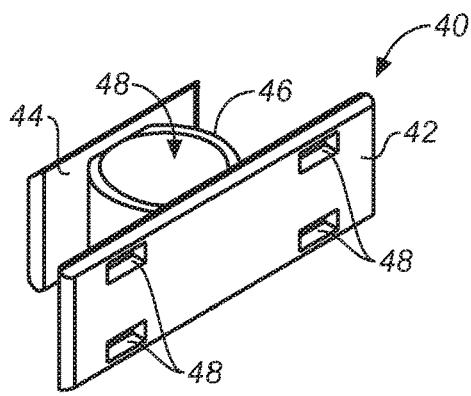
FIG. 12 is an upper perspective view of the magnetic holder base.
Figure 13:
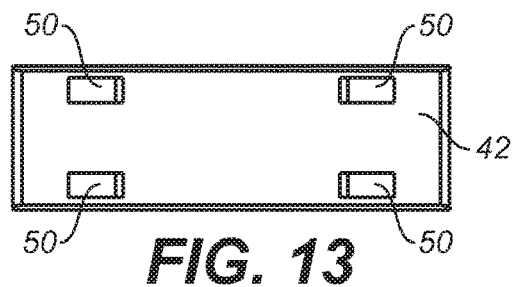
FIG. 13 is a bottom view thereof.
Figure 14:
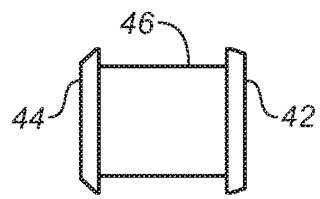
FIG. 14 is an end view thereof.
Figure 15:
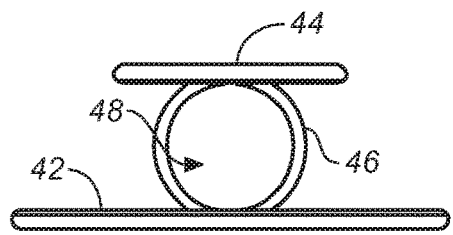
FIG. 15 is a side view in elevation thereof.
Figure 16:
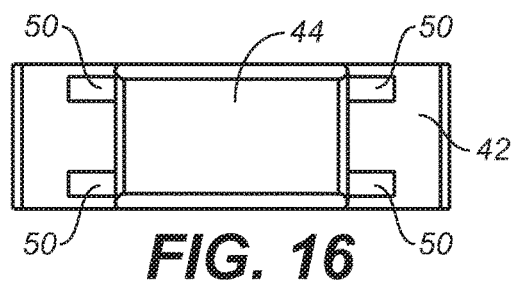
FIG. 16 is a top plan view thereof.

Referring to FIGS. 1 through 16, wherein like reference numerals refer to like components in the various views, there is illustrated therein a new and improved magnet holder for a tie-down strap, generally denominated 10 herein. These figures illustrate an embodiment of the inventive magnet holder, showing that in an embodiment the magnet holder comprises a base 40 and a cover 60. The base includes a first plate 42 and a second plate 44, each with planar surfaces in a parallel orientation with one another. Disposed between the plates is a cylindrical magnet keeper 46, with a cylindrical interior chamber 48 sized to contain one or more powerful neodymium or other disc magnets and oriented on its side relative to the first and second plates. The first plate includes a plurality of spaced-apart slots 50 disposed near its edge and around the magnet keeper 46.

The magnet holder cover 60 is an elongate closed ring that includes parallel planar front and back sides, 62, 64, each having a lower edge 66, 68 with integral flexible tabs 70, 72. The tabs are positioned and oriented to insert into the slots 50 of the first plate to make a snap-fit connection of the cover on the base. The front and back sides of the cover are joined by right and left angled semi-cylindrical shoulders 74, 76, having interior sides 78, 80 which are sized to closely conform to the cylindrical rod of the tie-down hook 12.

The magnet holder is configured for after-market installation on the tie-down hook, though OEM installation at the time of manufacture is contemplated and entirely within the scope of the invention. After disc magnets are placed in the magnet keeper 46, the base 40 is positioned within the void defined by the triangular body. The cover is then translated over the hook fingers 24, moved down the hook and over the second plate until the snap-fit tabs of the cover insert into the slots 50 of the first plate 42, thereby covering the magnet keeper 46 and forming an attractive enclosure or housing with design features that fit seamlessly into those of the hook and strap assembly. When so assembled, the magnets in the keeper enable a user to secure the hook onto ferromagnetic anchor points on storage structure or surface, thereby preventing inadvertent movement of the hook during tie-down operations.

From the foregoing, it will be seen that in its most essential aspect, the magnet holder for a tie-down strap hook of the present invention is configured for installation on a hook formed of bent cylindrical rod and having an interior opening, the magnet holder including: (1) a base with substantially planar opposing and parallel first and second plates, the first plate including fastener structure; (2) a magnet keeper disposed between the first and second plates; and (3) a cover having parallel planar front and back sides, each having a lower edge with integral fastener structure configured to engage with the fastener structure of the base, and right and left angled semi-cylindrical shoulders disposed between and separating the front and back sides, the right and left shoulders having interior sides configured to conform to the cylindrical rod of the tie-down hook.

The written description herein, along with the accompanying drawings, will enable one of ordinary skill in the art to practice the invention. While the disclosure is directed to various embodiments of the invention, the embodiments do not limit the invention to the exact construction, dimensional relationships, and operation shown and described. Modifications, alternative constructions, changes and equivalents will readily occur to those skilled in the art and may be employed, as suitable, without departing from the true spirit and scope of the invention.

Therefore, the above description and illustrations should not be construed as limiting the scope of the invention, which is defined by claims provided in connection with a non-provisional patent application claiming the benefit of the filing date of the instant application.

What is claimed as invention is:

1. A magnet holder for installation on a tie-down strap hook formed of bent cylindrical rod configured with an interior opening, said magnet holder comprising:
   a base including substantially planar opposing and parallel first and second plates, said first plate including fastener structure;
   a magnet keeper disposed between said first and second plates; and
   a cover having parallel planar front and back sides, each having a lower edge with integral fastener structure configured to engage with said fastener structure of said base, right and left angled semi-cylindrical shoulders disposed between and separating said front and back sides, said right and left shoulders having interior sides configured to conform to the cylindrical rod of the tie-down hook.

2. The magnet holder of claim 1, wherein said fastener structure in said first plate is a plurality of spaced-apart slots disposed near a perimeter edge, and configured for positioning around said magnet keeper.

3. The magnet holder of claim 2, wherein said fastener structure of said cover includes a plurality of flexible tabs positioned and oriented such that one flexible tab of said plurality of flexible tabs inserts into a slot of one of said plurality of slots in said first plate to make a snap-fit connection of the cover on the base.

4. The magnet holder of claim 1, wherein said magnet keeper defines a cylindrical interior chamber sized to contain one or more disc magnets.

5. The magnet holder of claim 1, wherein said magnet holder is configured for positioning within the interior opening of the hook.

6. The magnet holder of claim 1, wherein said second plate is configured to be captured and retained atop said cover by the bent rod of the hook.

7. The magnet holder of claim 1, wherein said cover is a unitary piece configured to slide over an end of the hook for mating with said first plate in the interior opening of the hook.

* * * * *